(12) United States Patent
Andreev et al.

(10) Patent No.: US 11,030,215 B2
(45) Date of Patent: Jun. 8, 2021

(54) TECHNOLOGIES FOR SCALING USER INTERFACE BACKEND CLUSTERS FOR DATABASE-BOUND APPLICATIONS

(71) Applicant: Ingram Micro Inc., Irvine, CA (US)

(72) Inventors: Alexander Vasilievich Andreev, Moscow (RU); Sergey Stanislavovich Kim, Lyubertsy (RU); Igor Vagulin, Dolgoprudny (RU)

(73) Assignee: INGRAM MICRO INC., Irvine, CA (US)

( * ) Notice: Subject to any disclaimer, the term of this patent is extended or adjusted under 35 U.S.C. 154(b) by 494 days.

(21) Appl. No.: 15/389,714

(22) Filed: Dec. 23, 2016

(65) Prior Publication Data

US 2018/0181638 A1 Jun. 28, 2018

(51) Int. Cl.
*G06F 16/27* (2019.01)
(52) U.S. Cl.
CPC ............ *G06F 16/27* (2019.01); *G06F 16/273* (2019.01)
(58) Field of Classification Search
CPC ............................... G06F 16/27; G06F 16/273
See application file for complete search history.

(56) References Cited

U.S. PATENT DOCUMENTS 8,838,539 B1 * 9/2014 Ashcraft ................. H04L 67/02
707/637
9,477,598 B2 10/2016 Song et al.

FOREIGN PATENT DOCUMENTS

CN 102402596 B 1/2016

OTHER PUBLICATIONS

Chang, Adaptable Replica Consistency Service for Data Grids, pp. 1-6 (Year: 2006).*
Soares et al.; MacroDB: Scaling Database Engines on Multicores; European Conference on Parallel Processing; Publication date Aug. 26, 2013; pp. 607-619; Publisher Springer, Berlin, Heidelberg.
(EP17883982.5) European Patent Office, Communication pursuant to Rules 70(2) and 70a(2) EPC, dated Jul. 24, 2020.
(EP17883982.5) European Patent Office, Extended European Search Report, dated Jul. 7, 2020.

* cited by examiner

*Primary Examiner* — Albert M Phillips, III
(74) *Attorney, Agent, or Firm* — Ice Miller LLP

(57) ABSTRACT

Technologies for scaling user interface (UI) backend clusters for database-bound applications include a plurality of UI application servers and a master database server. Each UI application server is configured to retrieve a session sequence ID associated with a present user session that corresponds to a sequence ID of a master database of the master database server during a most recent write operation of data to a master database during the present user session. Additionally, the UI application servers are configured to read, from a local read-only database, a local database sequence ID that corresponds to a sequence ID of the master database during a most recent asynchronous replication of the master database to the local read-only database. The UI application servers are further configured to read the data from the local read-only database in response to a determination that the session sequence ID is empty, or is less than or equal to the local database sequence ID. Additional embodiments are described herein.

22 Claims, 3 Drawing Sheets

TECHNOLOGIES FOR SCALING USER INTERFACE BACKEND CLUSTERS FOR DATABASE-BOUND APPLICATIONS

TECHNICAL FIELD OF THE DISCLOSED EMBODIMENTS

The presently disclosed embodiments generally relate to user interface backend clusters, and more particularly, to technologies for scaling user interface backend clusters for database-bound applications.

BACKGROUND OF THE DISCLOSED EMBODIMENTS

Typically, user interface (UI) backend clusters utilize multiple compute nodes to run UI backend code/scripts. However, such UI backend clusters typically share a single database in an effort to keep strong data consistency semantics. As such, traditional solutions can provide application-level scalability for CPU-bound applications, such as Hypertext Preprocessor (PHP) based web developed applications. Unfortunately, such traditional solutions do not scale for database-bound applications (e.g., Community Creature Project (CCP) v2 UI, Application Packaging Standard (APS) 2, etc.) because the database is not scalable.

Efforts to overcome the database scaling deficiency include adding multiple slaves; however, certain backend clusters (e.g., PostgreSQL) support only synchronous replication. As such, adding multiple slaves could lead to eventual data consistency issues and non-repeatable read attempts that may alter a UI during use, confusing a user of that UI. There is, therefore, a need for scalable UI backend clusters for database-bound applications.

SUMMARY OF THE DISCLOSED EMBODIMENTS

One aspect comprises a method for scaling a user interface (UI) backend cluster for database-bound applications, wherein the UI backend cluster includes a plurality of UI application servers and a master database server. The method includes receiving, by the master database server, a data modification request from a UI application server of the plurality of UI application servers, wherein the data modification request includes identifying information of the data to be modified; modifying, by the master database server, the data associated with the received data modification request in a master database managed by the master database server; updating, by the master database server, a master sequence identifier, wherein the master sequence identifier defines a unique value associated with the master database; transmitting, by the master database server, a message to the UI application server, wherein the message includes the updated master sequence identifier; and performing, by the master database server, an asynchronous replication of each respective local read-only database associated with each of the plurality of UI application servers, wherein performing the asynchronous replication includes storing the updated master sequence identifier into a corresponding field of each respective local read-only database.

In some embodiments, transmitting the message to the UI application server includes transmitting a data modification operation status with the message, and wherein the data modification operation status is usable to determine whether the data associated with the data modification request is pending modification. Additionally, in some embodiments the data modification operation status indicates the data of the local read-only database is stale. In other embodiments, updating the master sequence identifier comprises incrementing a previous value of the master database sequence identifier by an integer value of one. In still other embodiments, modifying the data comprises one of inserting, deleting, or updating corresponding data in the master database.

In another aspect, one or more computer-readable storage media comprising a plurality of instructions stored thereon that in response to being executed cause a master database server of a user interface (UI) backend cluster to receive, from a UI application server of a plurality of UI application servers of the UI backend cluster, a data modification request, wherein the data modification request includes identifying information of the data to be modified; modify the data associated with the received data modification request in a master database managed by the master database server; update a master sequence identifier, wherein the master sequence identifier defines a unique value associated with the master database; transmit a message to the UI application server, wherein the message includes the updated master sequence identifier; and perform an asynchronous replication of each respective local read-only database associated with each of the plurality of UI application servers, wherein to perform the asynchronous replication includes to store the updated master sequence identifier into a corresponding field of each respective local read-only database.

In some embodiments, to transmit the message to the UI application server includes to transmit a data modification operation status with the message, and wherein the data modification operation status is usable to determine whether the data associated with the data modification request is pending modification. Additionally, in some embodiments, the data modification operation status indicates the data of the local read-only database is stale. In other embodiments, to update the master sequence identifier comprises to increment a previous value of the master database sequence identifier by an integer value of one. In still other embodiments, to modify the data comprises to one of insert, delete, or update corresponding data in the master database.

In still another aspect, method for scaling user interface (UI) backend clusters for database-bound applications, wherein the UI backend clusters include a plurality of UI application servers and a master database server. The method includes performing, by a UI application manager of a UI application server of the plurality of UI application servers, a data read operation comprising: retrieving a session sequence ID associated with a present user session, wherein the session sequence ID corresponds to a first master database sequence ID received from a master database manager of the master database server during a most recent write operation of data to a master database of the master database server during the present user session; reading, in response to a determination the session sequence ID is not empty, a local database sequence ID from a local read-only database associated with UI application manager, wherein the local database sequence ID corresponds to a second master database sequence ID received from the master database manager during a most recent asynchronous replication of the master database to the local read-only database, and wherein the local read-only database comprises an asynchronously replicated copy of the master database; and determining whether the session sequence ID is less than or equal to the local database sequence ID; and reading, subsequent to a determination that the session sequence ID is less than or equal to the local database sequence ID, the data from the local read-only database.

In some embodiments, performing the data read operation further comprises reading, in response to a determination the session sequence ID is empty, the data from the local read-only database. In other embodiments, reading the local database sequence ID from the local read-only database associated with UI application manager comprises transmitting a data read request to a database manager of the UI application server, and further comprising querying, by the database manager, the local read-only database to retrieve the local database sequence ID from the local read-only database. In still other embodiments, reading the data from the local read-only database comprises transmitting a data read request to a database manager of the UI application server, and further comprising querying, by the database manager, the local read-only database to retrieve the data corresponding to the data read request from the local read-only database.

In some embodiments, the method further includes receiving, by the UI application manager, one or more messages from an endpoint device of a plurality of endpoint devices communicatively coupled to the UI application server; and rendering, by the UI application manager, data of a user interface as a function of the received message. In some embodiments, receiving the messages comprises receiving the message from a load balancing device communicatively coupled to each of the plurality of UI application servers, wherein the load balancing device is further communicatively coupled to each of the plurality of endpoint devices over a network. Additionally, in some embodiments, the method includes receiving the messages from the endpoint device comprises receiving all messages from that endpoint device at the UI application server during the user session.

In some embodiments, the method further includes determining, by the UI application manager and subsequent to having received an indication that the reading of the data from the local read-only database was unsuccessful, whether a threshold duration of time has elapsed since having received the indication; and performing, by the UI application manager and in response to a determination that the threshold duration of time has elapsed, another data read operation. Additionally, in some embodiments, the method includes transmitting, by the UI application manager and subsequent to having received an indication that the reading of the data from the local read-only database was unsuccessful, a data read request to a master database manager of the master database server, wherein the data read request is usable by the master database manager to query the master database to retrieve the data associated with the data read request from the local read-only database to retrieve the applicable data from the master database.

In yet another aspect, one or more computer-readable storage media comprising a plurality of instructions stored thereon that in response to being executed cause a user interface (UI) application server of a plurality of UI application servers of a UI backend cluster to: perform, by a UI application manager of the UI application server, a data read operation, wherein the data read operation comprises to: retrieve a session sequence ID associated with a present user session, wherein the session sequence ID corresponds to a first master database sequence ID received from a master database manager of a master database server of the UI backend cluster during a most recent write operation of data to a master database of the master database server during the present user session; read, in response to a determination the session sequence ID is not empty, a local database sequence ID from a local read-only database associated with UI application manager, wherein the local database sequence ID corresponds to a second master database sequence ID received from the master database manager during a most recent asynchronous replication of the master database to the local read-only database, and wherein the local read-only database comprises an asynchronously replicated copy of the master database; and determine whether the session sequence ID is less than or equal to the local database sequence ID; and read, subsequent to a determination that the session sequence ID is less than or equal to the local database sequence ID, the data from the local read-only database.

In some embodiments, to perform the data read operation further comprises to read, in response to a determination the session sequence ID is empty, the data from the local read-only database. In other embodiments, to read the local database sequence ID from the local read-only database associated with UI application manager comprises to (i) transmit, by the UI application manager, a data read request to a database manager of the UI application server and (ii) query, by a database manager of the UI application server, the local read-only database to retrieve the local database sequence ID from the local read-only database. In still other embodiments, to read the data from the local read-only database comprises to (i) transmit, by the UI application manager, a data read request to a database manager of the UI application server and (ii) query, by a database manager of the UI application server, the local read-only database to retrieve the data corresponding to the data read request from the local read-only database.

In some embodiments, the plurality of instructions further cause the UI application server to receive, by the UI application manager, one or more messages from an endpoint device of a plurality of endpoint devices communicatively coupled to the UI application server; and render, by the UI application manager, data of a user interface as a function of the received message. Additionally, in some embodiments, to receive the messages comprises to receive the message from a load balancing device communicatively coupled to each of the plurality of UI application servers, wherein the load balancing device is further communicatively coupled to each of the plurality of endpoint devices over a network.

In some embodiments, the plurality of instructions further cause the UI application server to determine, by the UI application manager and subsequent to having received an indication that the reading of the data from the local read-only database was unsuccessful, whether a threshold duration of time has elapsed since having received the indication; and perform, by the UI application manager and in response to a determination that the threshold duration of time has elapsed, another data read operation. Additionally, in some embodiments, the plurality of instructions further cause the UI application server to transmit, by the UI application manager and subsequent to having received an indication that the reading of the data from the local read-only database was unsuccessful, a data read request to a master database manager of the master database server, wherein the data read request is usable by the master database manager to query the master database to retrieve the data associated with the data read request from the local read-only database to retrieve the applicable data from the master database.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
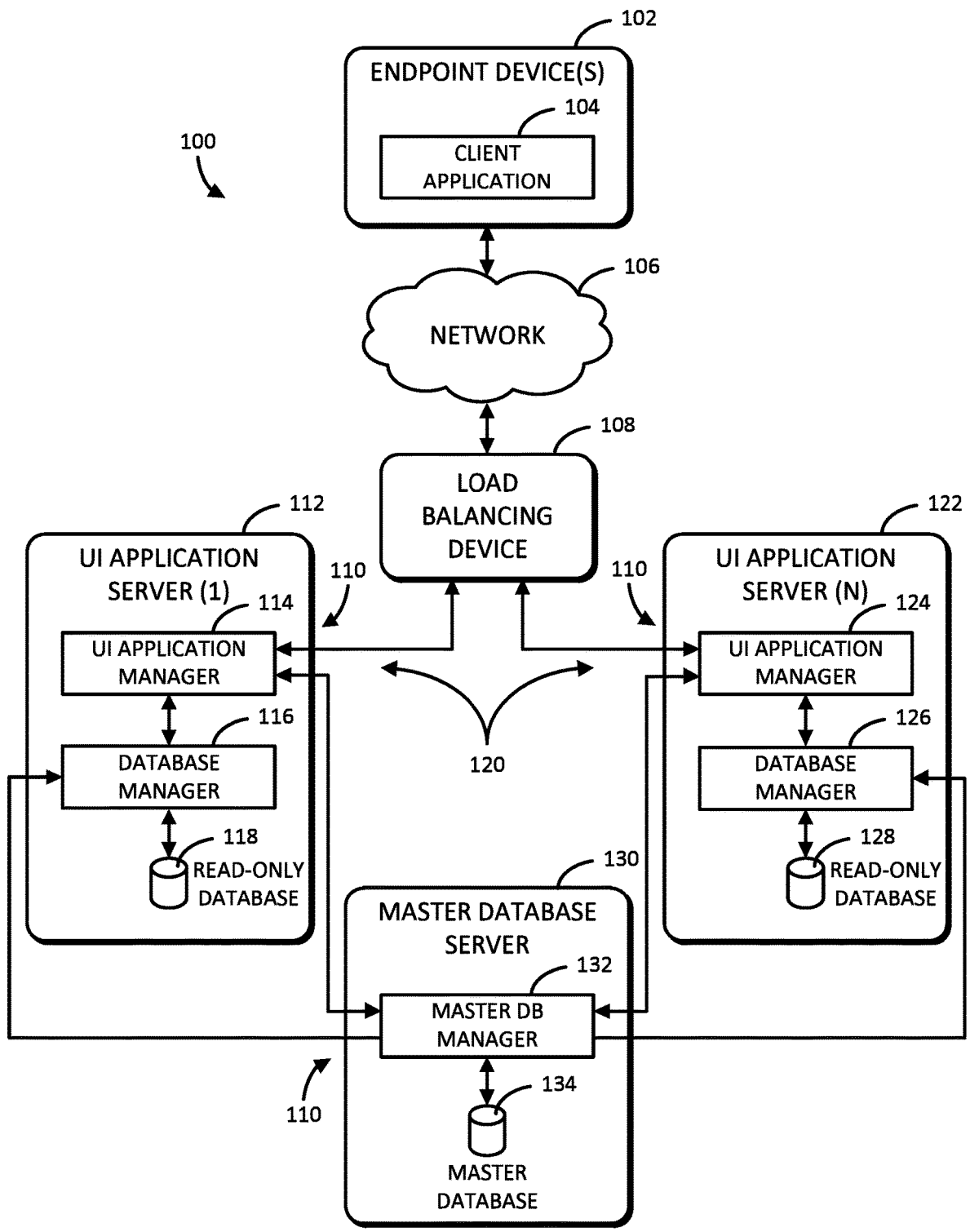
FIG. 1 is a block diagram of an illustrative embodiment of a user interface (UI) backend cluster system for scaling UI backend clusters for database-bound applications that includes one or more endpoint devices communicatively coupled, via a network, to multiple UI application servers, each of which are communicatively coupled to a master database server.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a user interface (UI) backend cluster system 100 for scaling UI backend clusters for database-bound applications. The UI backend cluster system 100 includes one or more endpoint devices 102 and multiple servers 110, including multiple UI application servers 120 and a master database server 130. In the illustrative UI backend cluster system 100, the one or more endpoint devices 102 are communicatively coupled to a load balancing device 108 via a network 106, and the load balancing device 108 is communicatively coupled to each of the UI application servers 120 (see, e.g., the UI application server (1) 112 and the UI application server (N) 122). Additionally, each of the UI application servers 120, or more particularly the UI application managers thereof (see, e.g., the UI application manager 114 and the UI application manager 124), are communicatively coupled to a master database server 130, or more particularly to a master database manager 132 of the master database server 130. The master database server 130 includes a master database 134 that is managed by the master database manager 132.

Each UI application manager is communicatively coupled to a read-only local database (see, e.g., the read-only database 118 and the read-only database 128) via a database manager (see, e.g., the database manager 116 and the database manager 126) that is configured to manage (i.e., read, write, insert, delete, etc.) data of the respective read-only local database. Each read-only local database is configured to store a read-only, asynchronous copy of the master database 134. Additionally, the master database manager 132 is configured to perform an asynchronous copy of the master database 134 (e.g., subsequent to a data write operation performed on the master database 134) with each read-only local database instance via the database manager of the respective UI application server 120.

In performing the asynchronous copy, a globally unique sequence identifier value corresponding to the then present version of the master database (i.e., a master database sequence ID) is thereby stored as a local database sequence ID in the respective read-only local database. In other words, the local database sequence ID stored at each read-only local database is indicative of the version of the master database 134 for which the read-only local database corresponds at the time of replication. Accordingly, as described in detail below, the local database sequence ID is usable to discern whether the data of the read-only local database is representative of the most current copy of the master database 134.

In an illustrative example, a client application 104 executing on one of the endpoint devices 102 transmits a UI-based request during a user session to a UI application manager executing on one of the UI application servers 120. As will be described in further detail below, the UI request is processed (e.g., received, parsed, analyzed, etc.) by the receiving UI application manager, at which point the UI application manager may initiate one or more data read operations (e.g., request data from a database) or data write operations (e.g., write data to a database) as a result. As described previously, the local databases of the respective UI application servers 120 are read-only copies of the data of the master database 134 at the time at which the last asynchronous replication was performed. Accordingly, any write operations are to be performed on the master database 134, while data read operations may be performed on either the respective read-only local database or the master database 134.

For data write operations, a UI application manager transmits a data modification request to the master database manager 132. As described further in FIG. 3 below, the master database manager 132 receives the data modification request, modifies the data in the master database 134 that is associated with the data modification request. Additionally, the master database manager 132 transmits the master database sequence ID to the UI application manager associated with the UI application server 120 from which the data modification request was received. Upon receipt, the UI application manager sets a session sequence ID (i.e., corresponding to the present user session) to the received master sequence ID.

For data read operations, the UI application manager initiating the data read operation must first determine from which database to query the data from. To do so, as described further in FIG. 4, the UI application manager determines whether the data stored in the read-only local database is current. To determine whether the data to be read is current, the UI application manager checks whether the user session has a session sequence ID (e.g., from a previous write operation). If the user session does not have a session sequence ID, the data is requested from the read-only local database; otherwise, if the user session has a session sequence ID, the UI application manager compares the session sequence ID with the local database sequence ID to determine whether to read the data from the local read-only database, wait for the local read-only database to be asynchronously replicated, or read the data from the master database 134. Accordingly, the hierarchical structure of the master database 134 relative to the local read-only databases and respective sequence IDs (e.g., the master database sequence ID, the local database sequence ID, and the session sequence ID) allow for such UI backend clusters to be scaled.

The one or more endpoint devices 102 may be embodied as any type of computing device capable of performing the functions described herein, including communicating, via a network (e.g., the network 106), with the UI application servers 120 of the UI backend cluster system 100. Accordingly, the one or more endpoint devices 102 may include, but are not limited to, a desktop computer, a mobile computing device, an Internet-connected appliance, an Internet-connected television, or any other type of "smart" or otherwise Internet-connected device. In such embodiments in which an endpoint device 102 is embodied as a mobile computing device, it should be appreciated that the endpoint device 102 may be embodied as any type of portable computing device that uses mobile-specific hardware and software components for operating, executing, and providing services and applications on a mobile architecture, such as smartphones, wearables (e.g., smartwatches, smart glasses, etc.), tablets, laptops, etc.

The client application 104 may be embodied as any type of network-based software application configured to communicate with a UI application manager of a UI application server 120 in a client-server architecture. In other words, as opposed to a stand-alone application, or thick client, the client application 104 is embodied as a thin client (e.g., a web browser, an email client, etc.) configured to communicate with a server-based application (e.g., a cloud-based web server) over a network (e.g., the network 106) in an effort to provide a service to the user of the endpoint devices 102 connected thereto. In other words, the client application 104 may not be embodied. It should be appreciated that, in some embodiments, the user as used herein may refer to a person (i.e., a human user) or the endpoint device 102 itself.

The network 106 may be implemented as any type of wired and/or wireless network, including a local area network (LAN), a wide area network (WAN), a global network (the Internet), etc. Accordingly, the network 106 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

For example, one or more of such network computing devices may be configured to couple one or more of the endpoint devices 102 to the network 106 in a LAN configuration using wired (e.g., Ethernet, token ring, etc.) and/or wireless (e.g., Bluetooth®, Wi-Fi®, wireless broadband, ZigBee®, etc.) communication technologies and associated protocols. In furtherance of the example, the LAN may be coupled (e.g., via coaxial, mobile telephony, fiber, etc.) to one or more larger area networks (e.g., WANs, metropolitan area networks (MANs), the Internet, etc.) via additional network computing devices of the network 106.

The load balancing device 108 may be embodied as any type of load balancer device, including any software, hardware, firmware, and circuitry, that is configured to perform the functions described herein, including to operate as a reverse proxy, distributing network and/or application traffic across a number of servers (e.g., the UI application servers 120). For example, in some embodiments, the load balancing device 108 may support sticky sessions, such that all requests received from a particular one of the endpoint devices 102 during a user session is routed to the same one of the UI application servers 120, in order to achieve read consistency. It should be appreciated that while the load balancing device 108 is illustratively shown as a single device, the load balancing operations may be performed by more than one load balancing device 108 to increase reliability and availability through redundancy.

Figure 2:
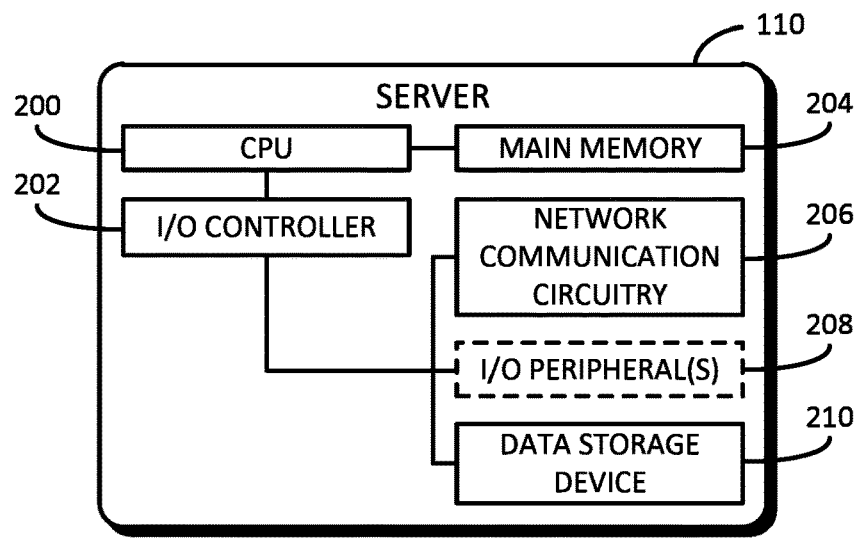
FIG. 2 is a block diagram of an illustrative embodiment of one of the servers of the UI backend cluster system of FIG. 1.

Each of the servers 110 (i.e., the UI application servers 120 and the master database server 130) may be embodied as any type of compute and/or storage device capable of performing the functions described herein. Referring now to FIG. 2, an illustrative embodiment of a server 110 representative of one or more of the UI application servers 120 and the master database server 130 is shown. The illustrative server 110 includes a central processing unit (CPU) 200, an input/output (I/O) controller 202, a memory 204, a network communication circuitry 206, and a data storage device 210, as well as, in some embodiments, one or more I/O peripherals 208. It should be appreciated that alternative embodiments may include additional, fewer, and/or alternative components to those of the illustrative server 110, such as a graphics processing unit (GPU). It should be additionally appreciated that one or more of the illustrative components may be combined on a single system-on-a-chip (SoC) on a single integrated circuit (IC).

The CPU 200, or processor, may be embodied as any type of hardware or combination of circuitry capable of processing data. Accordingly, the CPU 200 may include one processing core (not shown) in a single-core processor architecture, or multiple processing cores in a multi-core processor architecture. Irrespective of the number of processing cores, the CPU is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the server 110. Illustratively, the I/O controller 202 is configured to receive input/output requests from the CPU 200, and send control signals to the respective input/output devices, thereby managing the data flow to/from the server 110.

The memory 204 may be embodied as any type of computer hardware or combination of circuitry capable of holding data and instructions for processing. Such memory 204 may be referred to as main or primary memory. It should be appreciated that, in some embodiments, one or more components of the server 110 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the server 110 to a computer network (e.g., the network 106), as well as other devices (e.g., the load balancing device 108, the UI application servers 120, the master database server, etc.) of the UI backend cluster system 100.

The one or more I/O peripherals 208 may be embodied as any auxiliary device configured to connect to and communicate with the computing device 102. For example, the I/O peripherals 208 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output).

In some embodiments, the I/O peripherals 208 may be connected to the server 110 via a cable (e.g., a ribbon cable, a wire, a universal serial bus (USB) cable, a high-definition multimedia interface (HDMI) cable, etc.) of the server 110. In such embodiments, the cable is connected to a corresponding port (not shown) of the server 110 for which the communications made therebetween can be managed by the I/O controller 202. In alternative embodiments, the I/O peripherals 208 may be connected to the server 110 via a wireless mode of communication (e.g., Bluetooth®, Wi-Fi®, etc.) which can be managed by the network communication circuitry 206.

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary or secondary storage, and are typically used to store a large amount of data relative to the memory 204 described above.

It should be appreciated that the type of components of the respective server 110 may be predicated upon the type and intended use of the respective server 110. For example, the master database server 130 may be configured as a database server with less compute capacity relative to the compute capacity of the UI application servers 120. Similarly, the UI application servers 120 may be configured as application servers with more compute capacity relative to the compute capacity of the master database server 130.

Referring again to FIG. 1, it should be appreciated that each of the one or more endpoint devices 102, as well as the load balancing device 108, may contain like components to that of the illustrative server 110 of FIG. 2. Accordingly, such like components are not described herein to preserve clarity of the description. It should be further appreciated that, in some embodiments, each of the one or more endpoint devices 102 and the load balancing device 108 may contain additional or fewer components than that of the illustrative server 110 of FIG. 2.

Referring again to the UI application servers 120, in some embodiments, the UI application servers 120 may be architected in a cluster, which can be horizontally scaled according to the number of users (e.g., endpoint devices 102) and/or required performance metrics (e.g., quality of service). The illustrative UI application servers 120 of FIG. 1 include a first UI application server, designated as UI application server (1) 112, and an Nth UI application server, designated as UI application server (N) 122. It should be appreciated that the Nth UI application server (i.e., UI application server (N) 122) represents "N" additional UI application servers 120, wherein "N" is a positive integer value. The illustrative UI application server (1) 112 includes a UI application manager 114, a database manager 116, and a read-only database 118 local to the UI application server (1) 112. Similarly, the illustrative UI application server (N) 122 includes a UI application manager 124, a database manager 126, and a read-only database 128 local to the UI application server (2) 122.

The UI application servers 112, 122 may be embodied as any combination of software, hardware, firmware, and circuitry capable of performing the functions described herein. Such functions include interfacing with the client applications 104 of the endpoint devices 102 (e.g., via the load balancing device 108 over the network 106), the read-only databases 118, 128 (e.g., via the respective database manager 116, 126), and the master database manager 132 of the master database server 130 (e.g., via the respective database manager 116, 126). Each of the UI application managers 114, 124 are configured to render data and provider UIs by which to manage the rendered data. Each of the database managers 116, 126 of the UI application servers 112, 122 are configured to manage the read operations initiated by the UI application managers 114, 124, such as may be initiated in response to requests received from the client applications 104 of the endpoint devices 102.

It should be appreciated that, under certain conditions, some read operations initiated by one of the UI application managers 120 (e.g., UI application manager 114) may be transmitted to another of the UI application managers 120 (e.g., UI application managers 124) in an effort to read data from the read-only database of the other of the UI application managers 120. For example, the UI application manager 114 may transmit a data read request to the UI application managers 124 in an effort to read data from the read-only database of the UI application managers 124. It should be further appreciated that, in some embodiments, the read-only databases (i.e., read-only database 118 and read-only database 128) may not be local to the respective the UI application server 120, but rather may be the closest in proximity or lowest in cost associated with the interconnect between the UI application server 120 and the server 110 on which the read-only database is stored.

For example, in such embodiments, the UI application server 120 may be comprised of an application server that handles the compute operations and a storage server that manages the read-only database. In such embodiments, the combination of the application server and the storage server, despite not being housed on the same server 110, is intended to encompass a UI application server 120 for the purposes of describing the functions presented herein. Irrespective of the proximity of the respective read-only database to its managing UI application manager, it should be appreciated that the read-only database should be as close to the UI application manager as possible in order to minimize data fetching time. In some embodiments, the read-only database may be hosted on different from single database hardware resources to reduce the impact on performance and redistribution.

The master database server 130 may be embodied as any combination of software, hardware, firmware, and circuitry capable of performing the functions described herein, including interfacing with the UI application managers (e.g., the UI application managers 114, 124) of the UI application servers 120 (e.g., the UI application servers 112, 122) and managing the master database 134. To manage the master database 134, the illustrative master database server 130 includes a master database manager 132 configured to perform read/write operations on the master database 134 to read, insert, delete, and update the contents of the master database 134. The master database manager 132 is further configured to perform asynchronous replication of modified data of the master database 134 to an asynchronous copy of the master database 134 (i.e., the read-only databases 118, 128). It should be appreciated that the read-only databases 118, 128 are read-only asynchronous copies of the master database 134. Accordingly, the read-only databases 118, 128 should adhere to the same database schema as the master database 134.

The master database manager 132 is additionally configured to generate/update the master database sequence ID (i.e., subsequent to data modification operations being performed) and transmit the master database sequence ID to the UI application server(s) 120. Accordingly, as described previously, the master database sequence ID can be used to identify whether the data of a local read-only database is current or stale. The master database sequence ID may be generated by the master database manager 132 on the basis of regular sequence related database schema or any other logic known to those of skill in the art, and may be updated based on an incremented value of the previous master database sequence ID. Irrespective of the generation/update process, the generated master database sequence ID should be unique across a lifecycle of the UI backend cluster system 100 and the generation schema should be thread-safe. In other words, different data modifications (e.g., performed as a function of two different, parallel data modification requests) should not be able to assign the same master database sequence ID.

Figure 3:
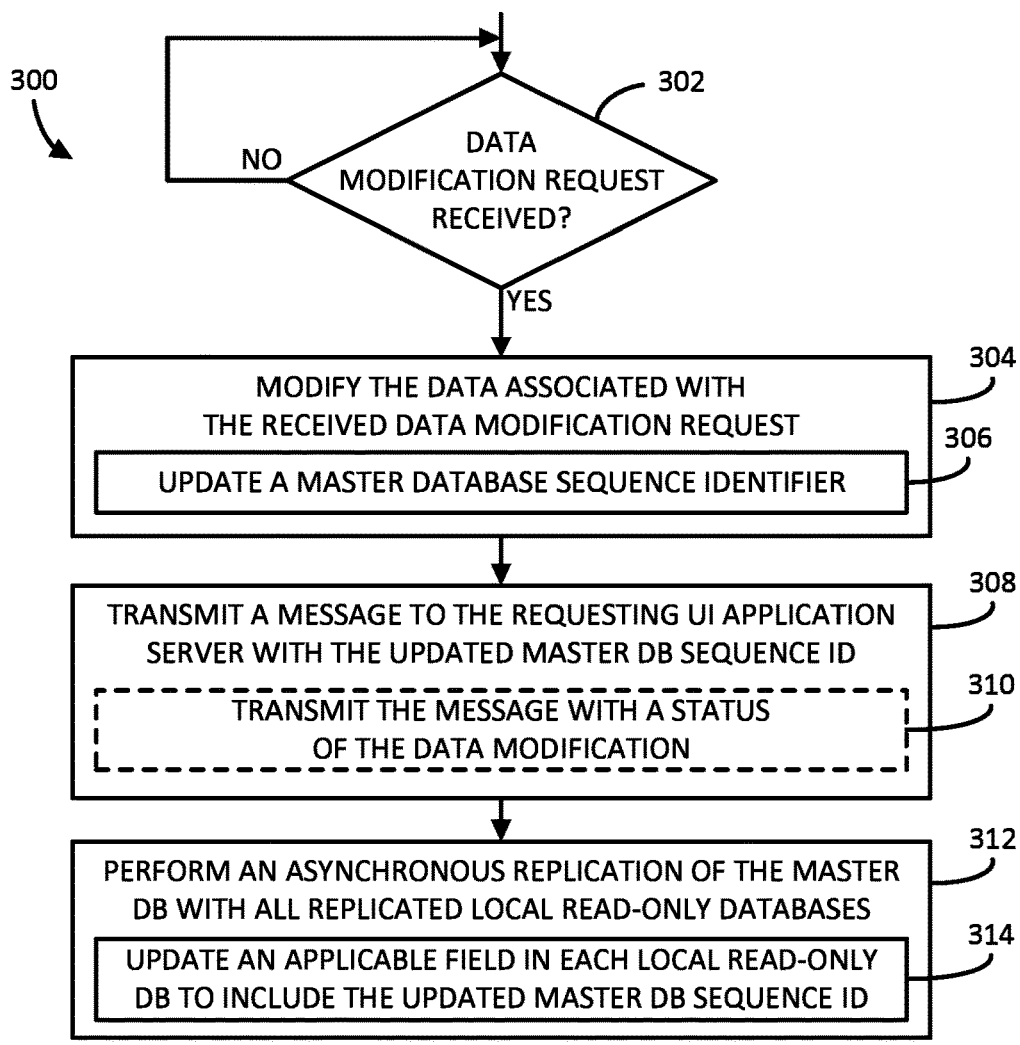
FIG. 3 is a schematic flow diagram of an illustrative method for handling a data modification request that may be performed by the master database server of the UI backend cluster system of FIG. 1.

Referring now to FIG. 3, an illustrative method 300 is provided for handling a data modification request (i.e., a received data write request), that may be performed by a master database server (e.g., the master database server 130 of FIG. 1), or more particularly by a master database manager (e.g., the master database manager 132 of FIG. 1) of the master database server 130. The method 300 begins in block 302, in which the master database server 130 determines whether a data modification request has been received from a UI application server (e.g., one of the UI application servers 120 of FIG. 1).

As described previously, the data modification request may be received from a UI application manager (e.g., the UI application manager 114, the UI application manager 124, etc.) presently executing on a respective one of the UI application servers 120. The data modification request may be any type of message that is usable by the master database server 130 (e.g., by way of the master database manager 132) to modify (e.g., insert, delete, update, etc.) data stored at a master database (e.g., the master database 134) of the master database server 130. Accordingly, the data modification request includes any information usable to identify the data to be modified.

In block 304, the master database server 130 modifies the data associated with the data modification request received in block 302. Additionally, during the data modification operation, in block 306, the master database server 130 updates the master database sequence ID. As described previously, the master database sequence ID may be generated by the master database manager 132 on the basis of regular sequence related database schema or any other logic known to those of skill in the art. For example, the master database server 130 may be configured to update the master database sequence ID by incrementing the value of the master database sequence ID by one. As also described previously, irrespective of the generation process, the generated master database sequence ID should be unique across a lifecycle of the UI backend cluster system 100 and the generation schema should be thread-safe.

In block 308, the master database server 130 transmits a message to the requesting UI application server (i.e., the one of the UI application servers 120 from which the data modification request was received in block 302) that includes the master database sequence ID that was updated in block 306. In some embodiments, in block 310, the master database server 130 transmits a status of the data modification (i.e., a data modification operation status) with the message. For example, the data modification operation status may provide an indication as to whether the modification was successful or unsuccessful.

In block 312, the master database server 130 performs an asynchronous replication of the master database 134 with all of the replicated read-only databases (e.g., the read-only database 118, the read-only database 128, etc.). To do so, the master database manager 132 is configured to communicate with each of the database managers (e.g., the database manager 116, the database manager 126, etc.). It should be appreciated that in performing each asynchronous replication, in block 314, the master database server 130 sets a local database sequence ID value (e.g., in a field of the local read-only database and the master database 134) to the updated master database sequence ID in each local read-only database as a result of the asynchronous replication. In other words, a field in the master database 134 that includes the master database sequence ID, which was updated by the master database manager 132 in block 306, is now available in each local read-only database as a by-product of the asynchronous replication having been performed thereon.

Upon detection of that data field (i.e., the data field corresponding to the master database sequence ID) being changed (e.g., upon completion of the asynchronous replication), each of the respective UI application servers 120 are configured to set or otherwise associate the master database sequence ID with the user session by setting the session sequence ID equal to the received master database sequence ID. Accordingly, the asynchronous replication should be performed in a manner in which a minimal amount of latency is introduced (e.g., in an effort to satisfy user requirements and/or expectations). It should be appreciated that read operations may be performed on the local read-only database without the asynchronous replication having been completed. In other words, the data may be read from the local read-only database that includes data which corresponds to data from a version of the master database 134 that is not representative of the most current data of the master database 134.

As described previously, the load balancing device 108 may be configured to support sticky sessions. In such embodiments, the load balancing device 108 can route all requests received from a particular one of the endpoint devices 102 during a user session to the same one of the UI application servers 120. Alternatively, in other embodiments, the UI application managers may be configured to manage the user sessions, rather than the load balancing device 108. It should be appreciated that, in such embodiments, the UI application managers may be configured to make a replication of each user session with the associated session sequence IDs, such that the UI application managers may be configured to manage the user sessions.

Figure 4:
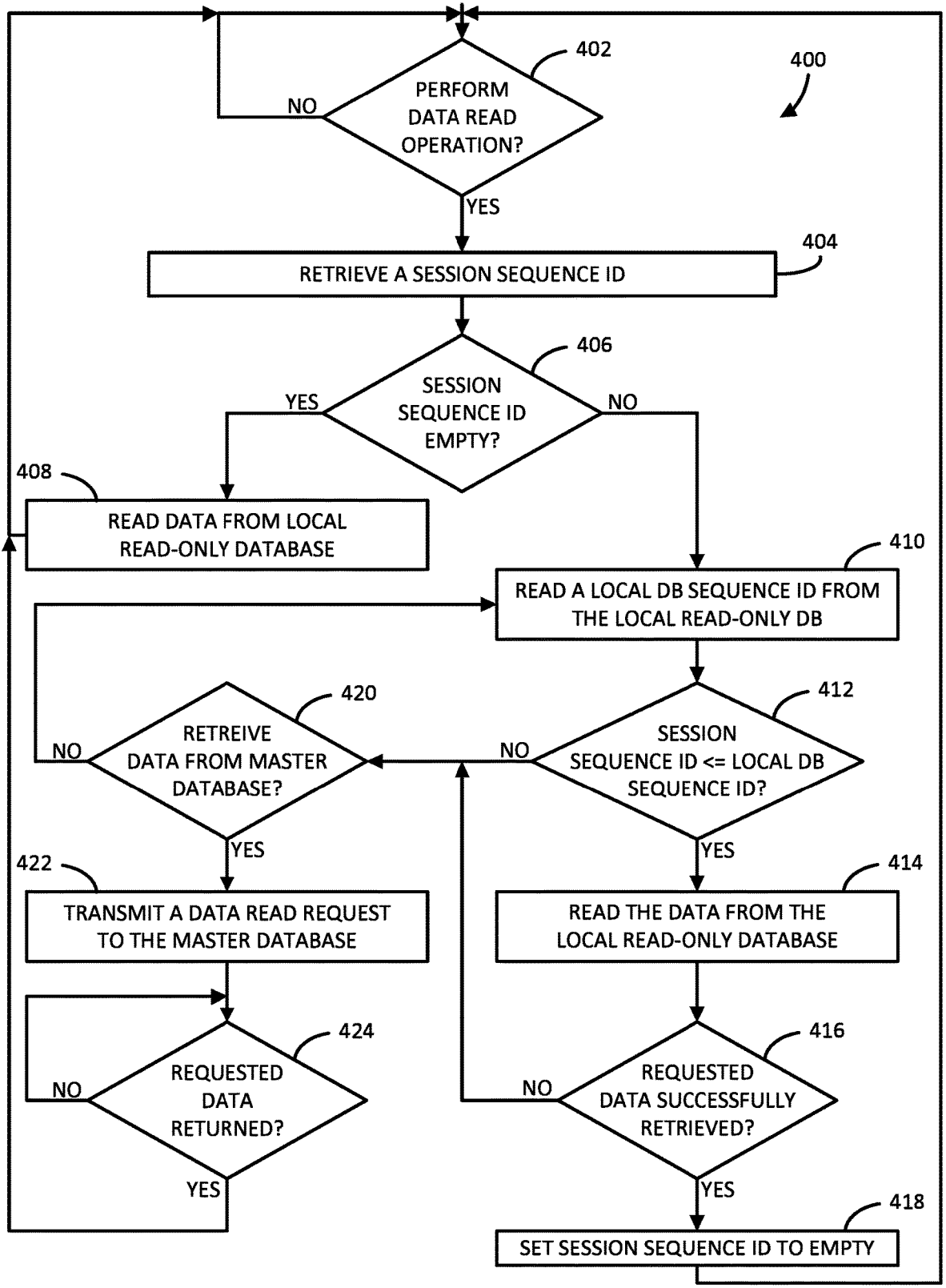
FIG. 4 is a schematic flow diagram of an illustrative method for performing a data read operation that may be performed by one of the UI application servers of the UI backend cluster system of FIG. 1.

Referring now to FIG. 4, an illustrative method 400 is provided for performing a data read operation that may be performed by a UI application server (e.g., one of the UI application servers 120 of FIG. 1), or more particularly by a UI application manager (e.g., the UI application manager 114, the UI application manager 124, etc.) of one of the UI application servers 120. The method 400 begins in block 402, in which the UI application manager determines whether to perform a data read operation. The data read operation may be performed in response to a UI request having been received from an endpoint device (e.g., one of the endpoint devices 102 of FIG. 1), such as may be required to render a user interface by the UI application manager.

If a data read operation is to be performed, the method 400 advances to block 404, in which the UI application manager retrieves a session sequence ID. As described previously, the session sequence ID corresponds to a master database sequence ID received subsequent to a data modification operation performed at a master database server (e.g., the master database 134 of the master database server 130 of FIG. 1), which was initiated by the UI application manager. In block 406, the UI application manager determines whether the retrieved session sequence ID is equal to its original, empty state of the session sequence ID (e.g., set equal to "None"). If so, the method 400 branches to block 408, in which the UI application manager reads data from a local read-only database (e.g., the read-only database 118 of the UI application server 112, the read-only database 128 of the UI application server (N) 122, etc.) associated with the UI application manager. To do so, the UI application manager may be configured to transmit a read request to the database manager of the local read-only database. Accordingly, it should be appreciated that the read request includes information usable by the database manager to retrieve the data from the local read-only database.

In some embodiments, the data may be read from a read-only database that is not the local read-only database associated with the UI application manager. In other words, in such embodiments, the read request may be transmitted to any of the local read-only databases of the UI backend cluster system 100. In an illustrative example in which the UI application server (1) 112 is executing a normal data read routine, the UI application server (1) 112 may transmit a data retrieval request to the local read-only database 118 (e.g., via one or more commands transmitted to the database manager 116) or to a remote read-only database, such as the read-only database 128 of the UI application server (N) 122 (e.g., via one or more commands transmitted to the database manager 126 and/or the UI application manager 124 of the UI application server (N) 122).

Referring again to block 406, if the UI application manager determines the retrieved session sequence ID is not empty, the method 400 branches to block 410. In block 410, the UI application manager reads a local database sequence ID from the local read-only database. As described previously, the local database sequence ID corresponds to a value of the master database sequence ID received during the latest asynchronous replication of the local read-only database. To reads the local database sequence ID from the local read-only database, the UI application manager may be configured to transmit a read request to the database manager of the respective local read-only database. Accordingly, it should be appreciated that the read request includes information usable by the database manager to retrieve the data from the respective local read-only database.

In block 412, the UI application manager determines whether the session sequence ID retrieved in block 404 is less than or equal to the local database sequence ID retrieved in block 410. In other words, the UI application manager determines whether the data is current or stale. If the UI application manager determines the session sequence ID is greater than the local database sequence ID in block 412, the method 400 branches to block 420, described below; otherwise, the method 400 branches to block 414. In block 414, the UI application manager transmits a data read request to the local read-only database. In other words, the UI application manager attempts to read the data from the local read-only database.

In block 416, the UI application manager determines whether the requested data returned successfully. For example, the UI application manager may receive an indication (e.g., a return status received in response to the data read request) that indicates the read-only local database is presently unavailable, such as may occur if the read-only local database is being synchronized with the master database 134 at the time at which the read operation is performed. If the UI application manager determines the requested data has been returned successfully, the method 400 advances block 418, in which the UI application manager sets a value of the session sequence ID to the original, empty state of the session sequence ID (e.g., set equal to "None") before the method 400 returns to block 402.

Otherwise, if the UI application manager determines the requested data was not returned successfully in block 416, the method 400 branches to block 420. In block 420, the UI application manager determines whether to attempt to read the data from the master database 134. In other words, the UI application manager determines whether to attempt to retrieve the data from the local read-only database (i.e., initiate another read operation at the local read-only database), or retrieve the data from the master database 134 (i.e., transmit a data read request to the master database 134). If the UI application manager determines to initiate another read operation from the local read-only database in block 420, the method 400 returns to block 410 to retrieve an updated local database sequence ID from the local read-only database.

In some embodiments, the method 400 may loop in block 420 until a threshold criterion is met before initiating the subsequent read operation at the local read-only database. For example, the threshold criterion may correspond to a duration of time (i.e., a threshold duration of time) such that the UI application manager may determine whether the duration of time has elapsed before attempting another data read operation. In such embodiments, the threshold duration of time may correspond to an expected duration of time in which the data synchronization is expected to be completed. In another example, the threshold criterion may correspond to a number of attempts (i.e., a maximum attempt count). In such embodiments, the UI application manager may determine whether a number of unsuccessful attempts have been made to read the data from the local read-only database, and attempt to read the data from the master database 134 if the maximum attempt count has been exceeded.

If the UI application manager determines not to initiate another read operation from the local read-only database, the method 400 advances to block 422. In block 422, the UI application manager transmits a data read request to the master database 134 of the master database server 130. In block 424, the UI application manager determines whether the requested data has been returned from the master database 134. If so, the method 400 returns to block 402 to determine whether to perform another data read operation.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for scaling user interface (UI) backend clusters for database-bound applications, wherein the UI backend clusters include a plurality of UI application servers and a master database server, the method comprising:
  performing, by a UI application manager of a UI application server of the plurality of UI application servers, a data read operation comprising:

retrieving a session sequence ID associated with a present user session, wherein the session sequence ID corresponds to a first master database sequence ID received from a master database manager of the master database server during a most recent write operation of data to a master database of the master database server during the present user session;

reading, in response to a determination the session sequence ID is not empty, a local database sequence ID from a local read-only database associated with UI application manager, wherein the local database sequence ID corresponds to a second master database sequence ID received from the master database manager during a most recent asynchronous replication of the master database to the local read-only database, and wherein the local read-only database comprises an asynchronously replicated copy of the master database; and determining whether the session sequence ID is less than or equal to the local database sequence ID;

reading, subsequent to a determination that the session sequence ID is less than or equal to the local database sequence ID, the data from the local read-only database;

transmitting, by the master database server to the UI application server, a data modification operation status wherein the modification operation status indicates the data from the local read-only database is stale;

receiving, by the UI application manager, one or more messages from an endpoint device of a plurality of endpoint devices communicatively coupled to the UI application server;

rendering, by the UI application manager, data of a user interface as a function of the received message;

wherein receiving the messages comprises receiving the message from a load balancing device communicatively coupled to each of the plurality of UI application servers, wherein the load balancing device is further communicatively coupled to each of the plurality of endpoint devices over a network; and wherein receiving the messages from the endpoint device comprises receiving all messages from that endpoint device at the UI application server during the user session.

2. The method of claim 1, wherein performing the data read operation further comprises reading, in response to a determination the session sequence ID is empty, the data from the local read-only database.

3. The method of claim 1, wherein reading the local database sequence ID from the local read-only database associated with UI application manager comprises transmitting a data read request to a database manager of the UI application server, and further comprising querying, by the database manager, the local read-only database to retrieve the local database sequence ID from the local read-only database.

4. The method of claim 1, wherein reading the data from the local read-only database comprises transmitting a data read request to a database manager of the UI application server, and further comprising querying, by the database manager, the local read-only database to retrieve the data corresponding to the data read request from the local read-only database.

5. The method of claim 4, further comprising:
determining, by the UI application manager and subsequent to having received an indication that the reading of the data from the local read-only database was unsuccessful, whether a threshold duration of time has elapsed since having received the indication; and performing, by the UI application manager and in response to a determination that the threshold duration of time has elapsed, another data read operation.

6. The method of claim 5, further comprising transmitting, by the UI application manager and subsequent to having received an indication that the reading of the data from the local read-only database was unsuccessful, a data read request to a master database manager of the master database server, wherein the data read request is usable by the master database manager to query the master database to retrieve the data associated with the data read request from the local read-only database to retrieve the applicable data from the master database.

7. One or more computer-readable storage media comprising a plurality of instructions stored thereon that in response to being executed cause a user interface (UI) application server of a plurality of UI application servers of a UI backend cluster to:

perform, by a UI application manager of the UI application server, a data read operation, wherein the data read operation comprises to:

retrieve a session sequence ID associated with a present user session, wherein the session sequence ID corresponds to a first master database sequence ID received from a master database manager of a master database server of the UI backend cluster during a most recent write operation of data to a master database of the master database server during the present user session;

read, in response to a determination the session sequence ID is not empty, a local database sequence ID from a local read-only database associated with UI application manager, wherein the local database sequence ID corresponds to a second master database sequence ID received from the master database manager during a most recent asynchronous replication of the master database to the local read-only database, and wherein the local read-only database comprises an asynchronously replicated copy of the master database; and determine whether the session sequence ID is less than or equal to the local database sequence ID;

read, subsequent to a determination that the session sequence ID is less than or equal to the local database sequence ID, the data from the local read-only database; and transmit by the master database server to the UI application server, a data modification operation status wherein the modification operation status indicates the data from the local read-only database is stale;

determine, by the UI application manager and subsequent to having received an indication that the reading of the data from the local read-only database was unsuccessful, whether a threshold duration of time has elapsed since having received the indication; and perform, by the UI application manager and in response to a determination that the threshold duration of time has elapsed, another data read operation; and transmit, by the UI application manager and subsequent to having received an indication that the reading of the data from the local read-only database was unsuccessful, a data read request to a master database manager of the master database server, wherein the data read request is usable by the master database manager to query the master database to retrieve the data associated with the data read request from the local read-only database to retrieve the applicable data from the master database.

8. The one or more computer-readable storage media of claim 7, wherein to perform the data read operation further comprises to read, in response to a determination the session sequence ID is empty, the data from the local read-only database.

9. The one or more computer-readable storage media of claim 7, wherein to read the local database sequence ID from the local read-only database associated with UI application manager comprises to (i) transmit, by the UI application manager, a data read request to a database manager of the UI application server and (ii) query, by a database manager of the UI application server, the local read-only database to retrieve the local database sequence ID from the local read-only database.

10. The one or more computer-readable storage media of claim 7, wherein to read the data from the local read-only database comprises to (i) transmit, by the UI application manager, a data read request to a database manager of the UI application server and (ii) query, by a database manager of the UI application server, the local read-only database to retrieve the data corresponding to the data read request from the local read-only database.

11. The one or more computer-readable storage media of claim 7, wherein the plurality of instructions further cause the UI application server to:
receive, by the UI application manager, one or more messages from an endpoint device of a plurality of endpoint devices communicatively coupled to the UI application server; and
render, by the UI application manager, data of a user interface as a function of the received message.

12. The one or more computer-readable storage media of claim 11, wherein to receive the messages comprises to receive the message from a load balancing device communicatively coupled to each of the plurality of UI application servers, wherein the load balancing device is further communicatively coupled to each of the plurality of endpoint devices over a network.

13. A user interface (UI) application server of a plurality of UI application servers for scaling UI backend clusters for database-bound applications, wherein the UI backend clusters include the plurality of UI application servers and a master database server, the UI application server comprising:
a CPU; and
a memory having stored therein a plurality of instructions that when executed by the processor cause the UI application server to:
perform, by a UI application manager of the UI application server, a data read operation, wherein the data read operation comprises to:
retrieve a session sequence ID associated with a present user session, wherein the session sequence ID corresponds to a first master database sequence ID received from a master database manager of the master database server during a most recent write operation of data to a master database of the master database server during the present user session;
read, in response to a determination the session sequence ID is not empty, a local database sequence ID from a local read-only database associated with UI application manager, wherein the local database sequence ID corresponds to a second master database sequence ID received from the master database manager during a most recent asynchronous replication of the master database to the local read-only database, and wherein the local read-only database comprises an asynchronously replicated copy of the master database; and
determine whether the session sequence ID is less than or equal to the local database sequence ID;
read, subsequent to a determination that the session sequence ID is less than or equal to the local database sequence ID, the data from the local read-only database;
transmit, by the master database server to the UI application server, a data modification operation status wherein the modification operation status indicates the data from the local read-only database is stale;
determine, by the UI application manager and subsequent to having received an indication that the reading of the data from the local read-only database was unsuccessful, whether a threshold duration of time has elapsed since having received the indication;
perform, by the UI application manager and in response to a determination that the threshold duration of time has elapsed, another data read operation; and
transmit, by the UI application manager and subsequent to having received an indication that the reading of the data from the local read-only database was unsuccessful, a data read request to a master database manager of the master database server, wherein the data read request is usable by the master database manager to query the master database to retrieve the data associated with the data read request from the local read-only database to retrieve the applicable data from the master database.

14. The UI application server of claim 13, wherein to perform the data read operation further comprises to read, in response to a determination the session sequence ID is empty, the data from the local read-only database.

15. The UI application server of claim 13, wherein to read the local database sequence ID from the local read-only database associated with UI application manager comprises to (i) transmit, by the UI application manager, a data read request to a database manager of the UI application server and (ii) query, by a database manager of the UI application server, the local read-only database to retrieve the local database sequence ID from the local read-only database.

16. The UI application server of claim 13, wherein to read the data from the local read-only database comprises to (i) transmit, by the UI application manager, a data read request to a database manager of the UI application server and (ii) query, by a database manager of the UI application server, the local read-only database to retrieve the data corresponding to the data read request from the local read-only database.

17. The UI application server of claim 13, wherein the one or more processors are further configured to execute the instructions to:
receive, by the UI application manager, one or more messages from an endpoint device of a plurality of endpoint devices communicatively coupled to the UI application server; and render, by the UI application manager, data of a user interface as a function of the received message.

18. The UI application server of claim 17, wherein to receive the messages comprises to receive the message from a load balancing device communicatively coupled to each of the plurality of UI application servers, wherein the load balancing device is further communicatively coupled to each of the plurality of endpoint devices over a network.

19. A method for scaling user interface (UI) backend clusters for database-bound applications, wherein the UI backend clusters include a plurality of UI application servers and a master database server, the method comprising:
performing, by a UI application manager of a UI application server of the plurality of UI application servers, a data read operation comprising:
retrieving a session sequence ID associated with a present user session, wherein the session sequence ID corresponds to a first master database sequence ID received from a master database manager of the master database server during a most recent write operation of data to a master database of the master database server during the present user session;
reading, in response to a determination the session sequence ID is not empty, a local database sequence ID from a local read-only database associated with UI application manager, wherein the local database sequence ID corresponds to a second master database sequence ID received from the master database manager during a most recent asynchronous replication of the master database to the local read-only database, and wherein the local read-only database comprises an asynchronously replicated copy of the master database; and
determining whether the session sequence ID is less than or equal to the local database sequence ID;
reading, subsequent to a determination that the session sequence ID is less than or equal to the local database sequence ID, the data from the local read-only database;
transmitting, by the master database server to the UI application server, a data modification operation status wherein the modification operation status indicates the data from the local read-only database is stale;
wherein reading the data from the local read-only database comprises transmitting a data read request to a database manager of the UI application server, and further comprising querying, by the database manager, the local read-only database to retrieve the data corresponding to the data read request from the local read-only database;
determining, by the UI application manager and subsequent to having received an indication that the reading of the data from the local read-only database was unsuccessful, whether a threshold duration of time has elapsed since having received the indication; and
performing, by the UI application manager and in response to a determination that the threshold duration of time has elapsed, another data read operation; and
transmitting, by the UI application manager and subsequent to having received an indication that the reading of the data from the local read-only database was unsuccessful, a data read request to a master database manager of the master database server, wherein the data read request is usable by the master database manager to query the master database to retrieve the data associated with the data read request from the local read-only database to retrieve the applicable data from the master database.

20. The method of claim 19, further comprising:
receiving, by the UI application manager, one or more messages from an endpoint device of a plurality of endpoint devices communicatively coupled to the UI application server; and
rendering, by the UI application manager, data of a user interface as a function of the received message.

21. The method of claim 20, wherein receiving the messages comprises receiving the message from a load balancing device communicatively coupled to each of the plurality of UI application servers, wherein the load balancing device is further communicatively coupled to each of the plurality of endpoint devices over a network.

22. The method of claim 21, wherein receiving the messages from the endpoint device comprises receiving all messages from that endpoint device at the UI application server during the user session.

* * * * *